J. F. Folmer,
Saw.
N° 81,267. Patented Aug. 18, 1868.
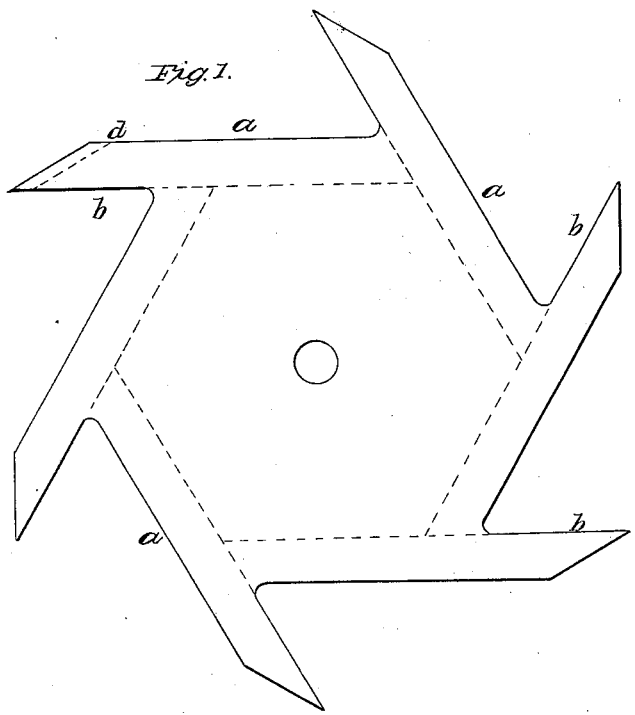

United States Patent Office.

JOHN F. FOLMER, OF PHILADELPHIA, PENNSYLVANIA, ASSIGNOR TO HIMSELF AND A. J. KELLY, OF SAME PLACE.

Letters Patent No. 81,267, dated August 18, 1868.

IMPROVEMENT IN CIRCULAR SAWS.

*The Schedule referred to in these Letters Patent and making part of the same.*

TO ALL WHOM IT MAY CONCERN:

Be it known that I, JOHN F. FOLMER, of Philadelphia, Pennsylvania, have invented an Improvement in Circular Saws; and I do hereby declare the following to be a full, clear, and exact description of the same.

My invention consists of a circular saw, the blade of which is composed of any desired number of straight sides, the continuation of each of which forms the back of one tooth, the front of the latter being parallel, or nearly so, with the back, all as set forth hereafter, so that in sharpening the teeth, the tedious manipulation demanded in gumming ordinary saws may be avoided.

In order to enable others skilled in the art to make and use my invention, I will now proceed to describe the mode of carrying the same into effect, reference being had to the accompanying drawing, which forms a part of this specification, and in which—

Figure 1 represents my improved circular saw, having six teeth, and

Figure 2 a saw with twelve teeth.

On reference to the red lines in fig. 1, it will be observed that the blade of the saw is hexagonal, the back, $a$, of each tooth coinciding with one of the hexagonal sides of the blade, or, in other words, one of the hexagonal sides of the blade, if continued outwards, forms the back of one tooth, the front, $b$, of which is parallel with the back.

This arrangement will answer well for a saw of comparatively small diameter. One of smaller diameter may be made with a square blade and four teeth, the back of which is a continuation of one side of the square blade, the front of the tooth being parallel to the back.

My invention may be carried out in a saw of larger diameter, in the manner illustrated in fig. 2, which represents a saw with twelve teeth projecting from a blade having twelve sides, the above-described plan of making the back of each tooth a continuation of one of the sides, and the front of each tooth parallel, or nearly so, with the back, being adhered to.

In repairing the teeth of ordinary circular saws, much tedious manipulation is demanded in practising the gumming process, but in my improved saw, the sharpening of the teeth can be readily accomplished by cutting away the bevelled ends, as clearly illustrated by the red line $d$, fig. 1.

Even when the teeth of my improved saw have been entirely cut away by sharpening, new teeth can be formed by shearing the sides of the blade.

I claim as my invention, and desire to secure by Letters Patent—

A circular saw, the blade of which is composed of any desired number of straight sides, the continuation of each of which forms the back of one tooth, the front of the latter being parallel, or nearly so, with the back, as set forth for the purpose specified.

In testimony whereof, I have signed my name to this specification in the presence of two subscribing witnesses.

JOHN F. FOLMER.

Witnesses:
   WM. A. STEEL,
   C. B. PRICE.